(12) United States Patent
Funakoshi et al.

(10) Patent No.: US 11,008,693 B2
(45) Date of Patent: May 18, 2021

(54) WASHING MACHINE AND CONTROL METHOD OF THE SAME

(71) Applicant: Samsung Electronics Co., Ltd, Suwon-si (KR)

(72) Inventors: Hidekazu Funakoshi, Kanagawa (JP); Tomonori Ueno, Kanagawa (JP); Yukinori Nakagawa, Kanagawa (JP); Hiroshi Katsumoto, Kanagawa (JP); Taro Yoshida, Kanagawa (JP); Yasuyuki Sonoda, Kanagawa (JP); Masaki Oshige, Kanagawa (JP); Yasumasa Nagasaki, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 16/228,589

(22) Filed: Dec. 20, 2018

(65) Prior Publication Data

US 2019/0186066 A1 Jun. 20, 2019

(30) Foreign Application Priority Data

Dec. 20, 2017 (JP) .............................. JP2017-243888
Sep. 14, 2018 (KR) ........................ 10-2018-0110024

(51) Int. Cl.
  *D06F 37/40* (2006.01)
  *H02P 5/505* (2016.01)
  (Continued)

(52) U.S. Cl.
  CPC .............. *D06F 37/40* (2013.01); *D06F 21/04* (2013.01); *D06F 37/30* (2013.01); *D06F 37/304* (2013.01);
  (Continued)

(58) Field of Classification Search
  CPC ........ D06F 21/04; D06F 37/30; D06F 37/304; D06F 37/40; H02K 16/02; H02P 5/505; H02P 21/06
  See application file for complete search history.

(56) References Cited

U.S. PATENT DOCUMENTS 6,495,980 B2 * 12/2002 Cho ....................... D06F 33/00
                                                      318/400.02
9,605,370 B2   3/2017 Kim et al.
                        (Continued)

FOREIGN PATENT DOCUMENTS

CN      206448064 U     8/2017
EP       3316458 A1     5/2018
                        (Continued)

OTHER PUBLICATIONS

International Search Report dated Apr. 9, 2019 in connection with International Patent Application No. PCT/KR2018/016296, 5 pages.

(Continued)

*Primary Examiner* — Joseph L. Perrin

(57) ABSTRACT

Disclosed herein is a washing machine. The washing machine includes a housing provided with an inlet for laundry disposed on a front surface thereof, a water tub provided inside of the housing and configured to store water, a drum rotatably provided inside of the water tub, a pulsator provided inside of the drum and configured to be rotated independently of the drum, a motor provided with a stator, and a first and second rotor connected to the drum and the pulsator, respectively, and at least one processor configured to apply a q-axis current to the stator to rotate the second rotor and configured to apply a d-axis current to the stator to rotate the first rotor based on a phase difference between the first rotor and the second rotor.

16 Claims, 8 Drawing Sheets

(51) Int. Cl.
   *D06F 21/04*     (2006.01)
   *D06F 37/30*     (2020.01)
   *H02K 16/02*     (2006.01)
   *H02K 11/215*    (2016.01)
   *H02K 5/173*     (2006.01)
   *H02K 7/14*      (2006.01)
   *H02K 29/08*     (2006.01)
   *H02K 21/12*     (2006.01)
   *H02K 21/22*     (2006.01)
   *H02K 21/16*     (2006.01)

(52) U.S. Cl.
   CPC ............ *H02K 5/1735* (2013.01); *H02K 7/14* (2013.01); *H02K 11/215* (2016.01); *H02K 21/12* (2013.01); *H02K 29/08* (2013.01); *H02P 5/505* (2016.02); *H02K 16/02* (2013.01); *H02K 21/16* (2013.01); *H02K 21/22* (2013.01)

(56) References Cited

U.S. PATENT DOCUMENTS

| | | | |
|---|---|---|---|
| 2005/0160771 A1* | 7/2005 | Hosoito | H02P 21/00 68/12.16 |
| 2007/0222404 A1* | 9/2007 | Atarashi | H02P 21/0089 318/494 |
| 2007/0222405 A1 | 9/2007 | Atarashi et al. | |
| 2008/0030163 A1* | 2/2008 | Fukuchi | H02P 21/22 318/801 |
| 2010/0139333 A1* | 6/2010 | Maekawa | H02P 21/18 68/212 |
| 2010/0242549 A1 | 9/2010 | Hosoito et al. | |
| 2014/0049124 A1* | 2/2014 | Gandhi | H02K 15/03 310/46 |
| 2015/0225885 A1* | 8/2015 | Kim | D06F 37/06 68/140 |
| 2015/0256056 A1* | 9/2015 | Kim | H02K 1/18 68/23.6 |
| 2016/0201246 A1* | 7/2016 | Song | D06F 37/40 8/137 |
| 2016/0376741 A1* | 12/2016 | Kim | H02K 1/148 310/90 |

FOREIGN PATENT DOCUMENTS

| | | |
|---|---|---|
| JP | 2017123767 A | 7/2017 |
| JP | 2018-026991 A | 2/2018 |
| WO | 2018/021727 A1 | 2/2018 |

OTHER PUBLICATIONS

Supplementary European Search Report dated Sep. 22, 2020 in connection with European Application No. 18890656.4, 11 pages.

* cited by examiner

WASHING MACHINE AND CONTROL METHOD OF THE SAME

CROSS-REFERENCE TO RELATED APPLICATIONS

This application is based on and claims priority under 35 U.S.C. § 119 to Japan Patent Application No. 2017-243888 filed on Dec. 20, 2017 in the Japan Intellectual Property Office, and Korean Patent Application No. 10-2018-0110024 filed on Sep. 14, 2018 in the Korean Intellectual Property Office, the disclosures of which are incorporated by reference herein in its entirety.

BACKGROUND

1. Field

Embodiments of the present disclosure relate to a washing machine including a dual rotor type motor and a control method of the washing machine.

2. Description of Related Art

Conventional washing machines may include a dual rotor type motor in which an inner rotor and an outer rotor are provided at an inside of a single stator.

SUMMARY

As for the dual rotor type motor, when a current flows with respect to a control axis corresponding to one of an inner rotor and an outer rotor having a phase difference, the other rotor may have an insufficient torque.

Therefore, it is an aspect of the present disclosure to compensate for a torque of a rotor that is out of phase in a dual rotor type motor.

Additional aspects of the present disclosure will be set forth in part in the description which follows and, in part, will be apparent from the description, or may be learned by practice of the present disclosure.

In accordance with an aspect of the disclosure, a washing machine includes a housing provided with an inlet for laundry disposed on a front surface thereof, a water tub provided inside of the housing and configured to store water, a drum rotatably provided inside of the water tub, a pulsator provided inside of the drum and configured to be rotated independently of the drum, a motor provided with a stator, and a first and second rotor connected to the drum and the pulsator, respectively; and at least one processor configured to apply a q-axis current to the stator to rotate the second rotor and configured to apply a d-axis current to the stator to rotate the first rotor based on a phase difference between the first rotor and the second rotor.

The washing machine may further include a phase detector configured to detect a phase difference between the first rotor and the second rotor. The at least one processor may rotate the first rotor and the second rotor in directions opposite to each other and then calculate the phase difference detected by the phase detector.

The at least one processor may select magnitude of the d-axis current applied to the first rotor, based on whether the calculated phase difference is equal to or greater than a predetermined angle.

When the calculated phase difference is equal to or greater than +90 degree, the at least one processor may select magnitude of the d-axis current of the first rotor, based on magnitude of q-axis current applied to the stator to rotate the second rotor.

When the calculated phase difference is equal to or less than −90 degree, the at least one processor may reduce the magnitude of the d-axis current of the stator to rotate the first rotor, based on the magnitude of q-axis current applied to the stator to rotate the second rotor.

The at least one processor may apply the d-axis current to the stator to rotate the first rotor with respect to a dq-control axis corresponding to the first rotor, and then switch the dq-control axis to the second rotor based on a predetermined number of driving failure.

The at least one processor may apply a predetermined magnitude of d-axis current to the stator to rotate the second rotor, based on a predetermined revolution.

The at least one processor may apply the predetermined magnitude of d-axis current to the stator, based on a forward and reverse rotation operation, wherein the forward and reverse rotation operation may be performed by performing a forward rotation operation rotating the first rotor and the second rotor in directions opposite to each other and then by rotating the first rotor and the second rotor in a direction opposite to the forward rotation operation.

The at least one processor may apply the d-axis current again to the stator to rotate the first rotor, based on a number of successes of forward and reverse rotation operation and the phase difference between the first rotor and the second rotor.

In the motor, the first rotor may be installed outside of the stator and the second rotor may be installed inside of the stator.

In accordance with another aspect of the disclosure, a control method of a washing machine including a drum rotatably provided inside of a water tub, a pulsator configured to be rotated independently of the drum, a motor provided with a plurality of rotors configured to rotate the drum and the pulsator, and a single stator, and at least one processor configured to control the motor, the control method includes applying a q-axis current to the stator to rotate the second rotor connected to the pulsator, and applying a d-axis current to the stator to rotate the first rotor based on a phase difference between the first rotor connected to the drum and the second rotor.

The application of d-axis current may include detecting a phase difference between the first rotor and the second rotor, and calculating the phase difference after rotating the first rotor and the second rotor in directions opposite to each other.

The application of d-axis current may include selecting magnitude of the d-axis current based on whether the calculated phase difference is equal to or greater than a predetermined angle.

The selection may include, when the calculated phase difference is equal to or greater than +90 degree, selecting magnitude of the d-axis current applied to the stator to rotate the first rotor, based on magnitude of q-axis current applied to the stator to rotate the second rotor.

The selection may include, when the calculated phase difference is equal to or less than −90 degree, reducing the magnitude of the d-axis current applied to the stator to rotate the first rotator, based on the magnitude of q-axis current applied to the stator to rotate the second rotor.

The control method may further include after applying the d-axis current to the stator to rotate the first rotor with respect to a dq-control axis corresponding to the first rotor, switching the dq-control axis to the second rotor based on a predetermined number of driving failure.

The control method may further include applying a predetermined magnitude of d-axis current to the stator to rotate the second rotor, based on a predetermined revolution.

The application of d-axis current may include applying the predetermined magnitude of d-axis current to the stator, based on a forward and reverse rotation operation, wherein the forward and reverse rotation operation may be performed by performing a forward rotation operation rotating the first rotor and the second rotor in directions opposite to each other and then by rotating the first rotor and the second rotor in a direction opposite to the forward rotation operation.

The control method may further include applying the d-axis current again to the stator to rotate the first rotor, based on a number of successes of forward and reverse rotation operation, and the phase difference between the first rotor and the second rotor.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
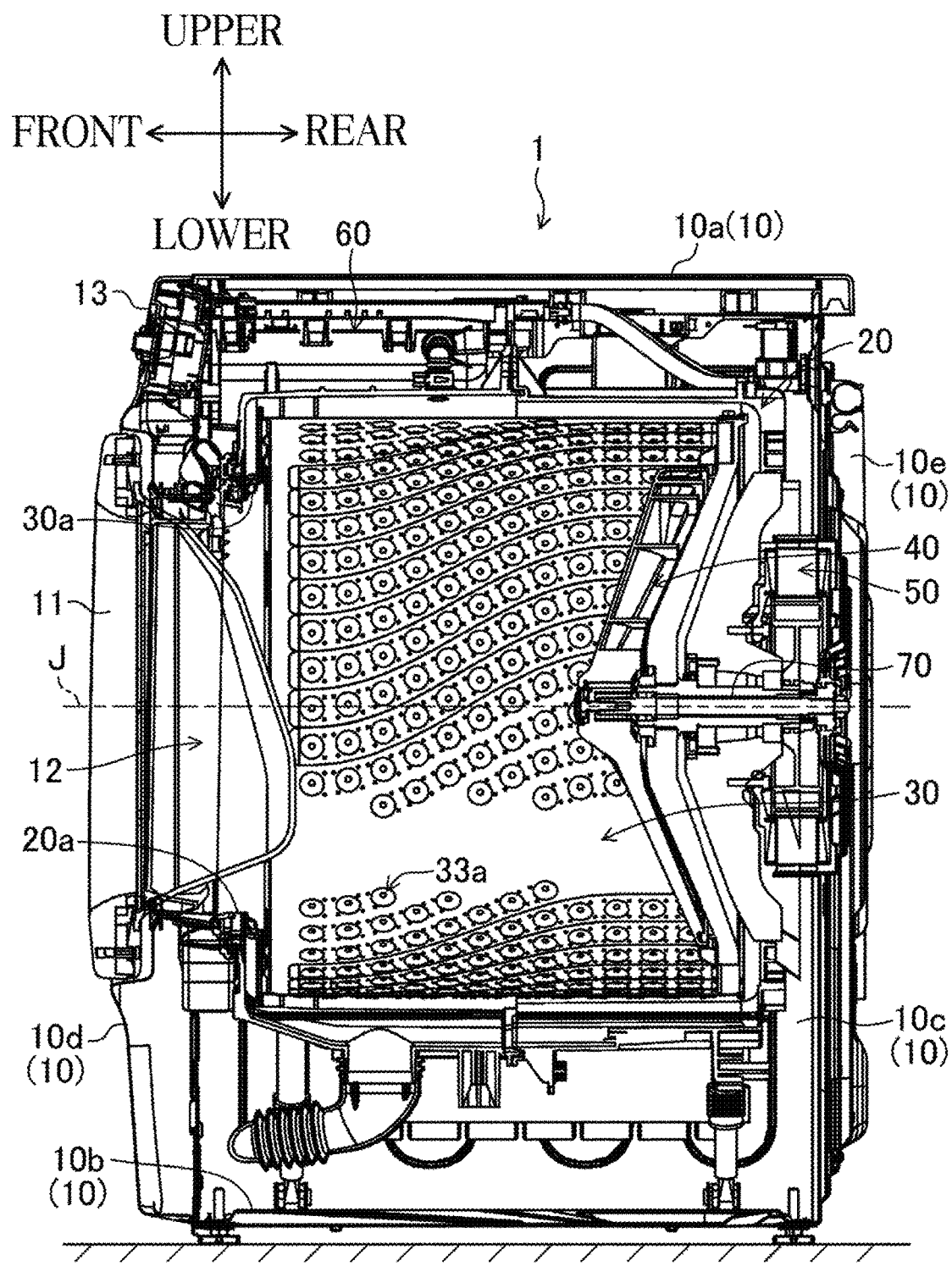
FIG. 1 is a side cross-sectional view illustrating a configuration of a washing machine according to an embodiment.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the present disclosure and configurations shown in the drawings are merely examples of the embodiments of the present disclosure, and may be modified in various different ways at the time of filing of the present application to replace the embodiments and drawings of the present disclosure.

Figure 2:
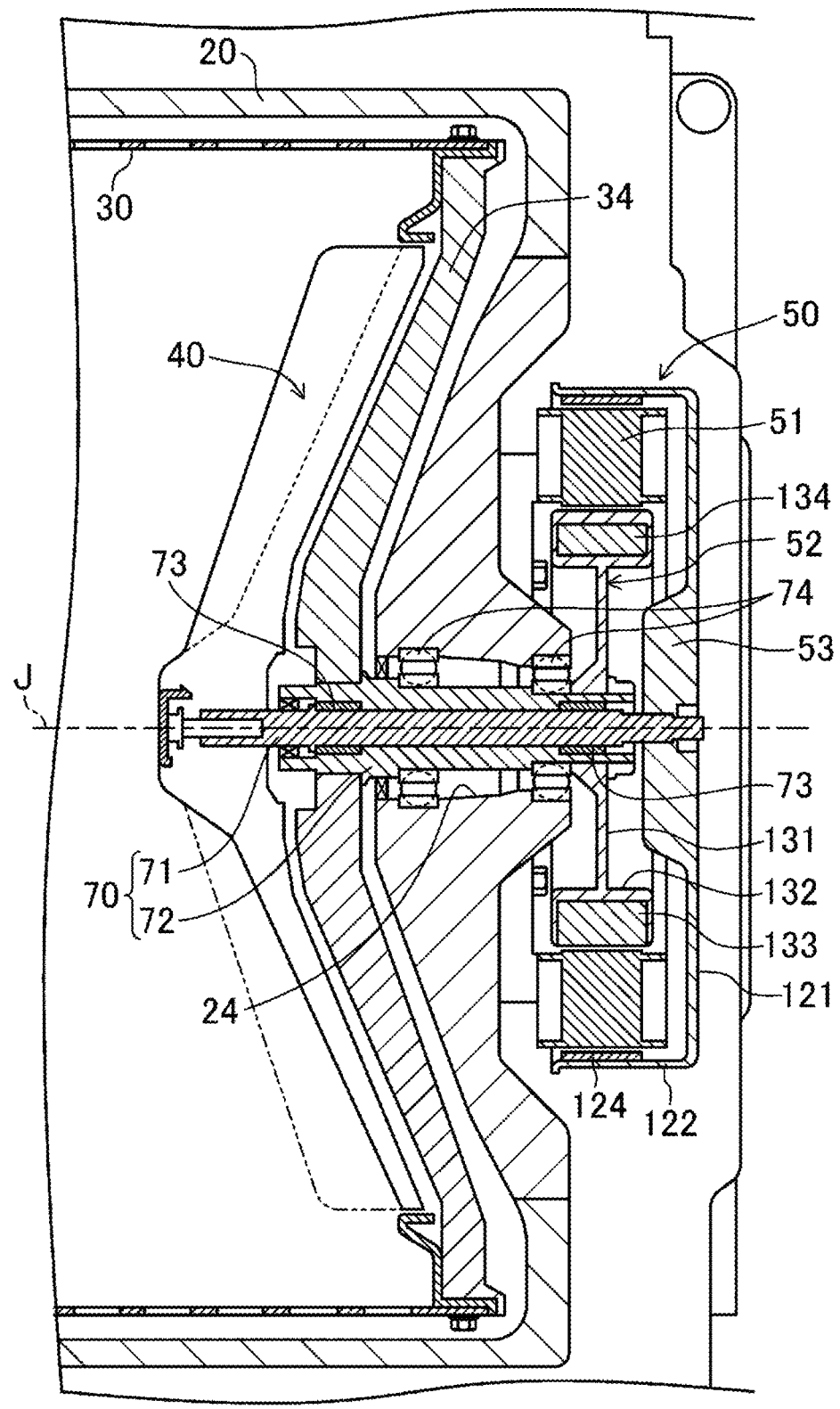
FIG. 2 is an enlarged side cross-sectional view illustrating a motor portion of FIG. 1.

FIGS. 1 and 2 illustrate a washing machine 1 (a drum type washing machine) according to an embodiment. The washing machine 1 includes a housing 10, a water tub 20, a drum 30, a pulsator 40, a motor 50 (driving device) and a controller 60 (control device). The washing machine 1 is configured to automatically perform washing, rinsing, and dewatering according to a set program (automatic type).

The housing 10 has a rectangular box shape having an upper surface 10a, a lower surface 10b, a pair of left and right side surfaces 10c, a front surface 10d and a rear surface 10e. At a substantially center of the front surface 10d, a circular inlet 12 opened and closed by a door 11 is provided. Laundry is put in and out through the inlet 12. On an upper portion of the front surface 10d, an operation panel 13 on which a switch is disposed is provided, and a controller 60 is embedded in the rear side of the operation panel 13.

The water tub 20 is a cylindrical container provided with a bottom and an opening 20a having a smaller diameter than an inner diameter at one end thereof. The water tub 20 is installed inside of the housing 10 such that the opening 20a is directed to the inlet 12 and a center line of the water tub 20 extends in a substantially horizontal direction. Upon the washing and rinsing, washing water or rinsing water is stored in the lower part of the water tub 20.

The drum 30 is a cylindrical container having an opening 30a at one end portion thereof and a base having a bottom at the other end portion thereof. The drum 30 is installed in the water tub 20 such that the opening 30a is directed to the front side. The opening 30a has an inner diameter smaller than a body of the drum. The drum 30 is rotatable about a rotation axis J extending in the front-rear direction. In the state in which the laundry is contained in the drum 30, each cycle such as washing, rinsing, and dewatering is performed.

The pulsator 40 is a disc-shaped member having a generally conical front surface with a low top, and is disposed at the bottom of the drum 30. The pulsator 40 is rotatable independently of the drum 30 about the rotation axis J.

As also shown in detail in FIG. 2, a double shaft 70 having an inner shaft 71 and outer shaft 72 is installed by passing through the rear surface of the water tub 20 about the rotation axis J. The outer shaft 72 is a cylindrical shaft having an axial length shorter than that of the inner shaft 71. The inner shaft 71 is rotatably axis-supported inside the outer shaft 72 via an inner bearing 73. The outer shaft 72 is rotatably axis-supported by a bearing housing of the water tub 20 through an outer bearing 74.

The drum 30 is connected to and supported by an upper end of the outer shaft 72. The pulsator 40 is connected to and supported by an upper end of the inner shaft 71. The outer shaft 72 and the inner shaft 71 are connected to the motor 50 disposed on the rear side of the water tub 20.

The controller 60 includes hardware such as at least one processor and a memory and software such as a control program and comprehensively controls the washing machine 1. The controller 60 automatically operates each cycle such as washing, rinsing and dewatering according to instructions input via the operation panel 13.

As illustrated in FIG. 2, the motor 50 has a small flat cylindrical shape having a diameter smaller than the water tub 20. The motor 50 is attached to the bottom of the water tub 20 such that a vertical axis of the motor 50 passes through the center of the rotation axis J.

The motor 50 includes an outer rotor 53, an inner rotor 52, the inner shaft 71, the outer shaft 72, and a stator 51. That is, the motor 50 is provided with the inner rotor 52 and the outer rotor 53 which are disposed inside and outside of the single stator 51, respectively (dual rotor). The motor 50 is configured such that the rotors 52 and 53 is connected to the pulsator 40 and the drum 30 and directly controls the pulsator 40 and the drum 30 (direct drive) without controlling clutch or acceleration/deceleration.

Figure 4:
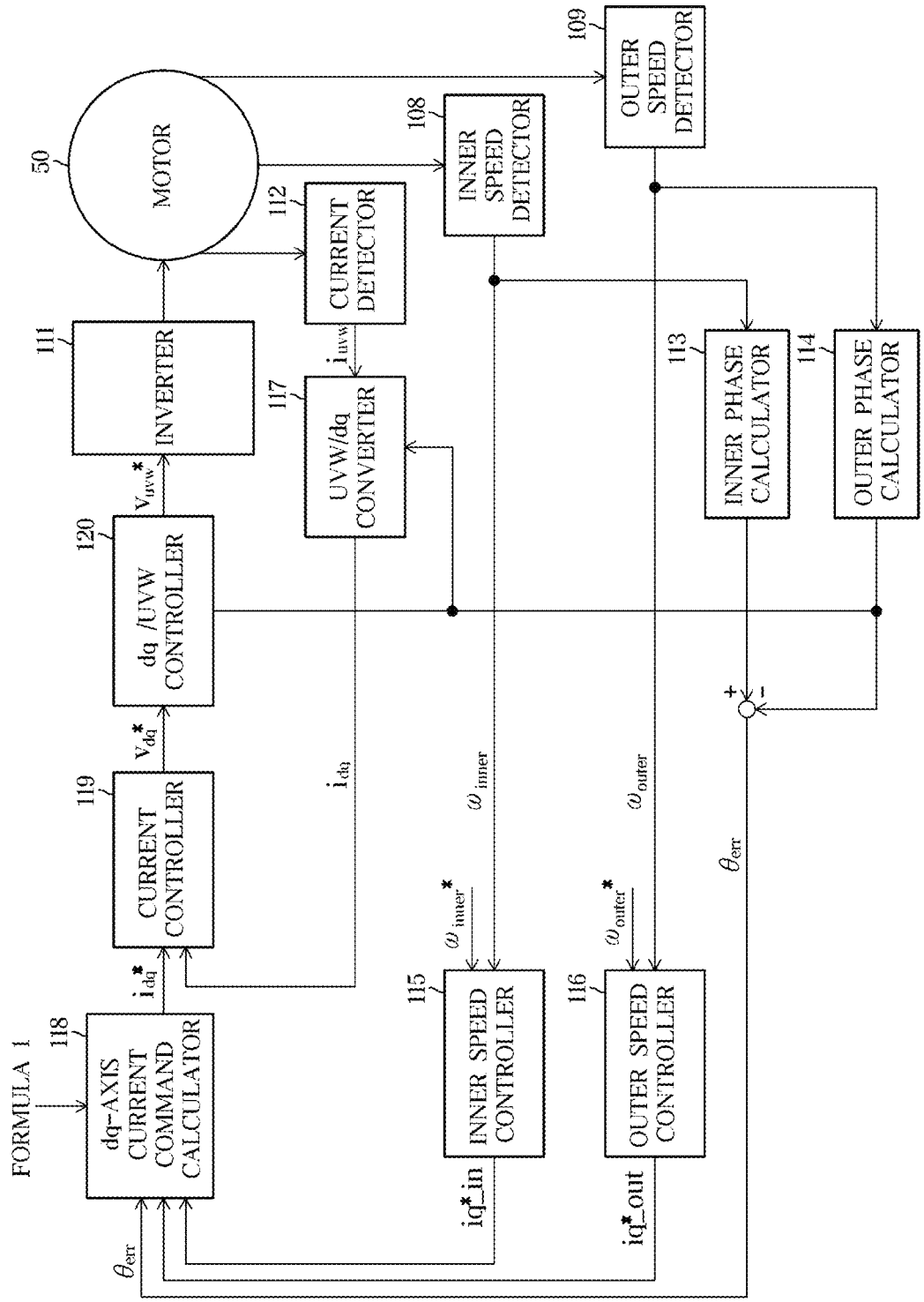
FIG. 4 is a block diagram illustrating a configuration of the motor and a controller.

Two rotors 52 and 53 are driven and controlled by a single inverter 111 (see FIG. 4). Each of the outer rotor 53 and the inner rotor 52 may share a coil (not shown) of the stator 51 and rotate independently by supplying a current to the coil. As for the motor 50, when the two rotors 52 and 53 rotate in the same direction and in the opposite direction, the ratio of revolutions of both rotors is a fixed value such as 1:1, and 1:−2. Switching in the rotation direction between the same direction and the opposite direction is performed by magnetization and the ratio of the revolutions in the same direction and the opposite direction is different from each.

The outer rotor 53 is a cylindrical member having a flat bottom. The outer rotor 53 includes a bottom wall 121 having a central portion opened, a rotor yoke 122 standing up around the bottom wall 121, and a plurality of outer magnets 124 formed of permanent magnets in a circular arc shape. The bottom wall 121 and the rotor yoke 122 are formed by pressing an iron plate so as to function as a back yoke.

According to an embodiment, the outer rotor 53 is a consequent type rotor. In the outer rotor 53, sixteen outer magnets 124 are arranged such that S poles are arranged at intervals in the circumferential direction, and the sixteen outer magnets 124 are fixed to the inner surface of the rotor yoke 122. In addition, by reversing the magnetic pole of the outer magnet 124, the number of magnetic poles of the outer rotor 53 may be switched between sixteen (16) poles and thirty-two (32) poles. According to an embodiment, demagnetization force of the outer magnet 124 is set to about 20 A.

The inner rotor 52 is a flat cylindrical member having an outer diameter smaller than that of the outer rotor 53. The inner rotor 52 includes an inner support wall 131 having a center portion opened, an inner peripheral wall 132 standing up around the inner support wall 131, and a plurality of inner magnets 135 formed of permanent magnet in a rectangular plate shape.

According to an embodiment, the inner rotor 52 is a spoke type rotor. In the inner rotor 52, thirty-two (32) inner magnets 135 are radially arranged at intervals in the circumferential direction, and are fixed to the inner peripheral wall 132. A rotor core 133 is disposed in the circumferential direction between the inner magnets 135.

The inner shaft 71 is a cylindrical shaft member. The inner shaft 71 is rotatably supported by the bearing bracket 73 through the inner bearing 73, the outer shaft 72 and a ball bearing. A lower end of the inner shaft 71 is connected to the outer rotor 53. An upper end of the inner shaft 71 is connected to the pulsator 40.

The outer shaft 72 is a cylindrical shaft member which is shorter than the inner shaft 71 and has an inner diameter larger than the outer diameter of the inner shaft 71. The outer shaft 72 is rotatably supported by the bearing bracket through the inner bearing 73 provided in the upper and lower side thereof, the inner shaft 71 and the outer bearing 74. The lower end portion of the outer shaft 72 is supported by a shaft support 24. The upper end portion of the outer shaft 72 is connected a flange shaft 34 of the drum 30.

The stator 51 is formed of an annular member having an outer diameter smaller than the inner diameter of the outer rotor 53 and an inner diameter larger than the outer diameter of the inner rotor 52. The stator 51 is provided with a plurality of teeth 161 and coils (not shown) embedded in the resin.

Figure 3:
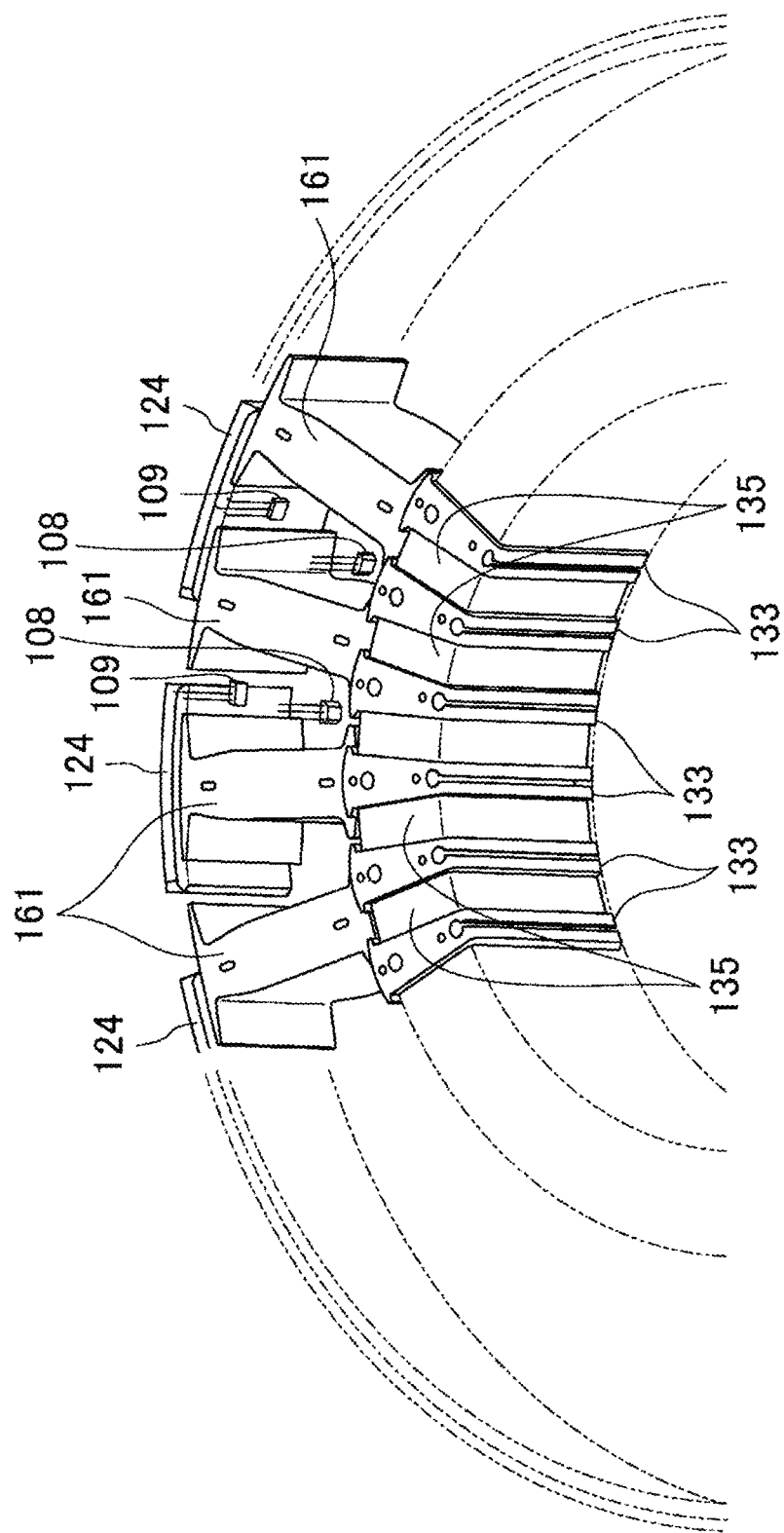
FIG. 3 is a perspective view illustrating a configuration contained in the motor.

As shown in FIG. 3, according to an embodiment, the stator 51 is provided with twenty-four (24) 'T'-shaped teeth 161 and coils (not shown) wound around each teeth 161. For each teeth 161, the coil is configured such that three wires coated by an insulating material continuously wound around each teeth 161 in a predetermined order and configuration. A group of teeth 161 in which the coil is formed are embedded in the thermosetting resin by mold molding while only the side end surface of each diameter are exposed, and are fixed in a predetermined arrangement in an insulated state. The teeth 161 are thin plate-shaped iron members in which its vertical cross-section has an I-shape. The teeth 161 are radially arranged at equal intervals, so as to be separated from each other around the entire circumference of the stator 51. The inner circumferential side and outer circumferential side end portions of the teeth 161 protrude in a flange shape in the circumferential direction from opposite corners thereof.

An inner speed detector 108 detecting a speed of the inner rotor 52 and an outer speed detector 109 detecting a speed of the outer rotor 53 are disposed between adjacent teeth 161. The inner speed detector 108 is disposed in the vicinity of the inner rotor 52. The outer speed detector 109 is disposed in the vicinity of the outer rotor 53. As long as detecting the speed, the inner speed detector 108 and the outer speed detector 109 may include both of an analogue speed sensor and a digital speed sensor according to the output method. Particularly, a speed sensor measuring an angular speed of a rotating body includes an electrical tachometer generator outputting a voltage proportional to a rotational speed, an optical tachometer detecting the rotational speed by collecting light reflected from a rotating body, and a gear-tooth sensor identifying a rotational speed by detecting a magnetic force. The gear-tooth sensor may include all of a magnetic gear-tooth sensor using a permanent magnet, a Hall effect gear-tooth sensor using a Hall element, and a magnetoresistive gear-tooth sensor.

As illustrated in FIG. 4, a single three-phase inverter 111 is connected to the motor 50. In the motor 50, when the current is supplied to the coil of the stator 51, different poles are simultaneously generated on the outer side and the inner side of the teeth 161 and the outer rotor 53 and the inner rotor 52 rotate independently of each other according to the rotating magnetic field.

As mentioned above, since the outer rotor 53 and the inner rotor 52 share the stator 51, it is possible to rotate the outer rotor 53 and the inner rotor 52 in a plurality of rotation modes, by the single inverter 111.

A control of the motor 50 will be described. First, an embodiment in which a phase difference (θerr) between the inner rotor 52 and the outer rotor 53 is less than +90 degrees or a case in which a phase difference (θerr) between the inner rotor 52 and the outer rotor 53 is greater than −90 degrees will be described.

FIG. 4 is a block diagram mainly illustrating elements which are related to an operation, among elements of the motor 50 and the controller 60 related to a motor control.

A current detector 112 is connected to the motor 50 and the current detector 112 detects a phase current (Iuvw) flowing on each phase of the inverter 111. The phase current (Iuvw) detected by the current detector 112 is converted into a resultant current (Idq) of a q-axis current and a d-axis current in an UVW/dq converter 117.

A speed of the inner rotor 52 (winner) detected by the inner speed detector 108 is transmitted to an inner phase calculator 113 and an inner speed controller 115. In the same manner, a speed of the outer rotor 53 (outer) detected by the outer speed detector 109 is transmitted to an outer phase calculator 114 and an outer speed controller 116.

The inner phase calculator 113 is configured to convert the speed (winner) detected by the inner speed detector 108 into an angle (θ). For example the inner phase calculator 113 may be implemented by an integrator. The outer phase calculator 114 is configured to convert the speed (outer) detected by the outer speed detector 109 into an angle (θ). For example the outer phase calculator 114 may be implemented by an integrator. The phase difference (θerr) between the inner rotor 52 and the outer rotor 53 is calculated based on the conversion results of the inner phase calculator 113 and the outer phase calculator 114, and the phase difference (θerr) is given to a dq-axis current command calculator 118.

A phase detecting device is composed of an inner phase detecting device detecting a phase of the inner rotor 52 and an outer phase detecting device detecting a phase of the outer rotor 53. The inner phase detecting device is composed of the inner speed detector 108 and the inner phase calculator 113 and the outer phase detecting device is composed of the outer speed detector 109 and the outer phase calculator 114. The inner phase detecting device and the outer phase detecting device are configured to detect a phase based on the speed detection result, but is not limited thereto. Therefore, the inner phase detecting device and the outer phase detecting device may directly detect a phase. In addition, the phase detecting device may be provided as a single element.

Based on the detection speed (ωinner) received from the inner speed detector 108 and a speed command value (ωinner*) according to a speed profile upon a general operation, the inner speed controller 115 calculates and outputs a torque command value (iq*_in) making the rotational speed of the inner rotor 52 into the speed command value (winner*). Based on the detection speed (ωouter) received from the outer speed detector 109 and a speed command value (ωouter*) according to a speed profile upon a general operation, the outer speed controller 116 receives differences from the outer speed detector 109 and outputs a torque command value (iq*_out) making the rotational speed of the outer rotor 53 into the speed command value (ωouter*).

Upon the operation (e.g., an opposite operation) the dq-axis current command calculator 118 applies the current, which is according to the phase difference (θerr) position between the inner rotor 52 and the outer rotor 53, to the d axis, other than the q axis current. Particularly, the dq-axis current command calculator 118 receives a torque command value (iq*_out, iq*_in) from the inner speed controller 115 and the outer speed controller 116 and outputs a d-axis current command value (id*) and a q-axis current command value (iq*) according to the following formula 1. In addition, the dq-axis current command calculator 118 performs current driving with respect to a dq-control axis corresponding to one side of the inner rotor 52 and the outer rotor 53. As an example of the formula 1, the dq-axis current command calculator 118 performs current driving with respect to the dq-control axis corresponding to the outer rotor 53. The opposite operation represents an operation mode in which the inner rotor 52 and the outer rotor 53 rotates in directions opposite to each other.

$$\begin{bmatrix} id^* \\ iq^* \end{bmatrix} = \begin{bmatrix} 0 \\ iq^*_{-out} \end{bmatrix} + \begin{bmatrix} \cos\theta_{err} & \sin\theta_{err} \\ -\sin\theta_{err} & \cos\theta_{err} \end{bmatrix} \begin{bmatrix} 0 \\ iq^*_{-in} \end{bmatrix} \quad \text{[Formula 1]}$$

여, $\theta_{err} = \theta_{inner} - \theta_{outer}$ id* represents a d-axis current command (control shaft: an outer rotor), iq* represents a q-axis current command (control shaft: an outer rotor), iq*_out represents a q-axis current command of the outer rotor 53, and iq*_in represents a q-axis current command of the inner rotor 52.

Figure 5:
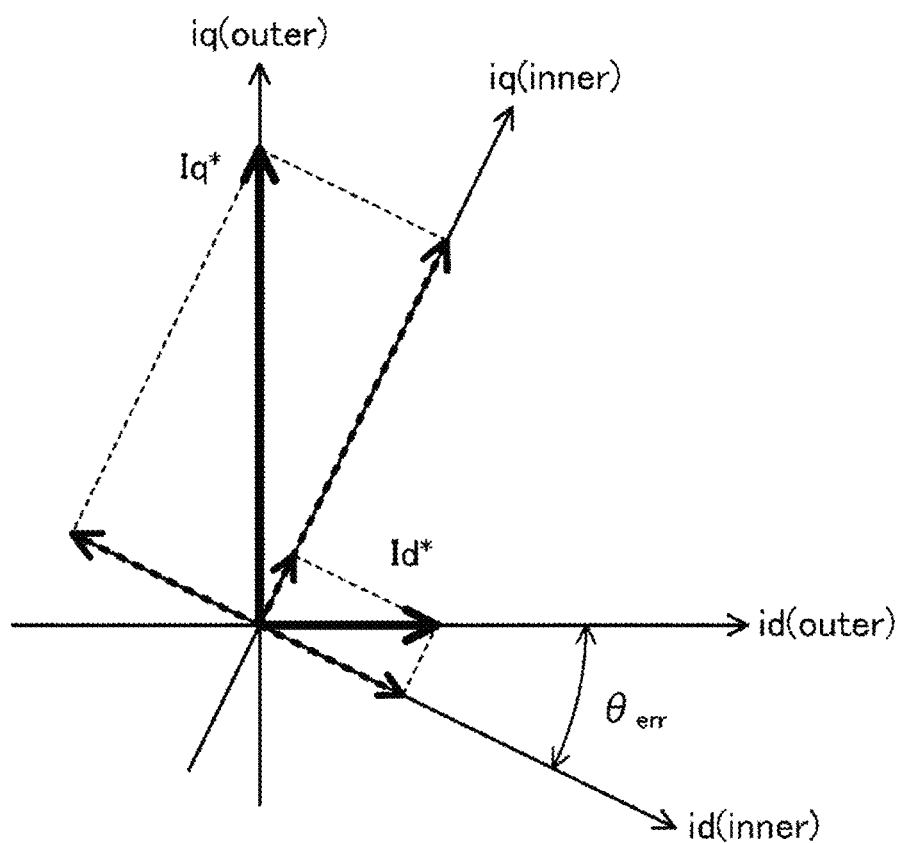
FIG. 5 is a view illustrating a d-axis current command and a q-axis current command.

FIG. 5 illustrates a phase of the inner rotor 52 lags by the phase difference (θerr) with respect to the outer rotor 53. This is because the outer rotor 53 is connected to the pulsator 40 and the inner rotor 52 is connected to the drum 30 and thus the load of the inner rotor 52 is heavier than that of the outer rotor 53.

As illustrated in FIG. 5, when the q-axis current command (iq*_out) is applied with respect to the control axis corresponding to the outer rotor 53, the following formula 2 is applied to the inner rotor 52 as the −axis current command (iq*_in)

$$iq^*_{-in} = iq^*_{-out} \times \cos\theta_{err} \quad \text{[Formula 2]}$$

That is, the torque of the inner rotor 52 decreases (insufficient) by an amount corresponding to the phase difference (θerr). Therefore, according to an embodiment, the d-axis current command (id*_out) according to the phase difference (θerr) is given to the outer rotor 53 and thus a torque corresponding to the current amount represented by [id*_out×sin θ err] is added to the inner rotor 52. Therefore, it is possible to compensate the torque of the inner rotor 52. A resultant current command (Idq*) (control axis: outer rotor) of the calculated d-axis current command (Id*) and q-axis current command (Iq*) is output to the current controller 119 at the rear end.

Based on the resultant current command (Idq*) received from the dq-axis current command calculator 118 and the resultant current (Idq) received from the UVW/dq converter 117, the current controller 119 outputs a voltage command value (Vdq*) making the q-axis current and the d-axis current of the motor 50 into the resultant current command (Idq*).

As mentioned above, according to an embodiment, when the phase difference (θerr) occurs between the outer rotor and the inner rotor in a state in which the outer rotor is the control axis and the motor 50 is in the opposite operation, it is configured to give the d-axis current command (id*_out) according to the phase difference (θerr), other than the q-axis current command (iq*_out). Accordingly, it is possible to compensate the torque that is insufficient for the inner rotor 52, based on the phase difference (θerr) between the outer rotor 53 and the inner rotor 52.

Next, the control that is performed when the phase difference (θerr) between the inner rotor 52 and the outer rotor 53 becomes +90° or more or when the phase difference (θerr) between the inner rotor 52 and the outer rotor 53 becomes −90° or less will be described. The basic configuration of FIG. 4 is the same as the control of the motor 50 described above, and a detailed description thereof will be omitted. The operation of the dq-axis current command calculator 118 will be mainly described.

Particularly, as for the control of the above-mentioned formula 1, when the phase difference becomes +90° or more or −90° or less, the dq-axis current command calculator 118 controls the current of the outer rotor 53 corresponding to the rotor in an advancing side, to be zero (0). Particularly, when the phase difference (θerr) is equal to or greater than +90° in the formula 1, the dq-axis current command calculator 118 controls the current to be the following formula 3.

$$iq^*_{\_in} \times \cos\theta_{err} = 0 \qquad \text{[Formula 3]}$$

Figure 7:
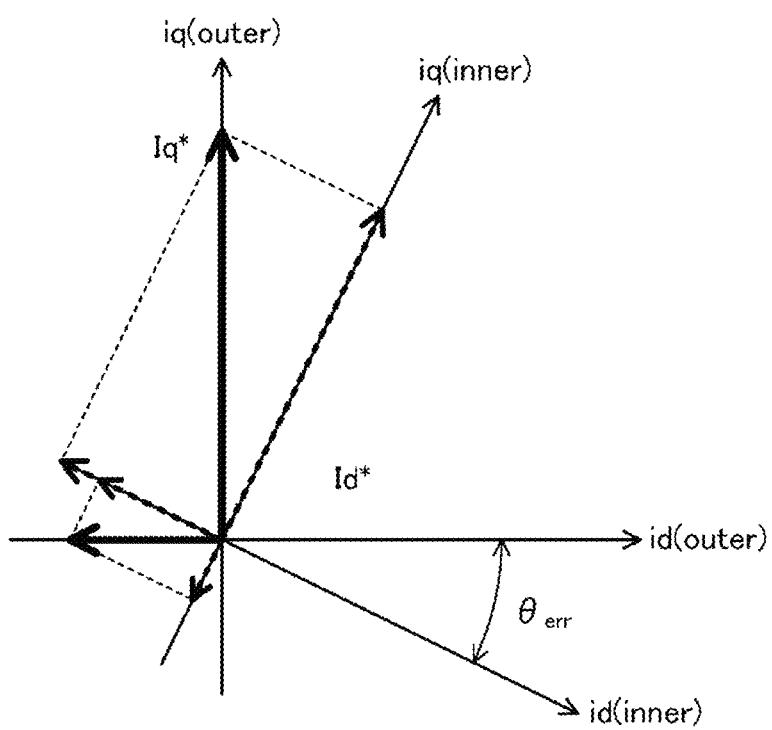
FIG. 7 is a view illustrating the d-axis current command and the q-axis current command.

That is, the q-axis current command (iq*_in) of the inner rotor 52 is controlled to be zero (0). At this time, the q-axis current command (iq*_ut) is continuously given to the outer rotor 52. The method of setting the q-axis current command (iq*_in) to zero (0) may be implemented by applying the d-axis current command (id*) in a direction opposite to the direction of FIG. 5, as illustrated in FIG. 7. In the same manner as the case of +90°, when the phase difference (θerr) is equal to or less than −90° in the formula 1, the dq-axis current command calculator 118 controls d-axis current command (id*_out) to be the following formula 4.

$$iq^*_{\_out} = 0 \qquad \text{[Formula 4]}$$

That is, the q-axis current command (iq*_in) of the inner rotor 52 is controlled to be zero (0).

In addition, when the current of the outer rotor 53 corresponding to the rotor in an advancing side, is controlled to be zero (0), it is appropriate to gradually reduce the current in accordance with the phase difference (θerr) between the inner rotor 52 and the outer rotor 53. There is no limitation in the method of reducing the current. Therefore, the current may be reduced linearly or may be variably reduced based on sin θerr. Particularly, as for the formula 3, when making the q-axis current command (iq*_in) of the inner rotor 52 into zero (0), the dq-axis current command calculator 118 gradually reduces the q-axis current command (iq*_in) according to the calculation result of formula 5.

$$iq^*_{\_in} \times |\sin\theta_{err}| \qquad \text{[Formula 5]}$$

Similarly, when the dq axis current command calculator 118 makes the q-axis current command (iq*_out) of the outer rotor 53 into zero (0) based on the formula 4, the dq axis current command calculator 118 gradually reduces the q-axis current command (iq*_out) based on the following formula 6.

$$iq^*_{\_out} \times |\sin\theta_{err}| \qquad \text{[Formula 6]}$$

A motor control related to the out of the lock state will be described with reference to FIG. 6. The basic configuration of FIG. 4 is the same as the control of the motor 50 described above, and a detailed description thereof will be omitted. The operation of the dq-axis current command calculator 118 will be mainly described.

Figure 6:
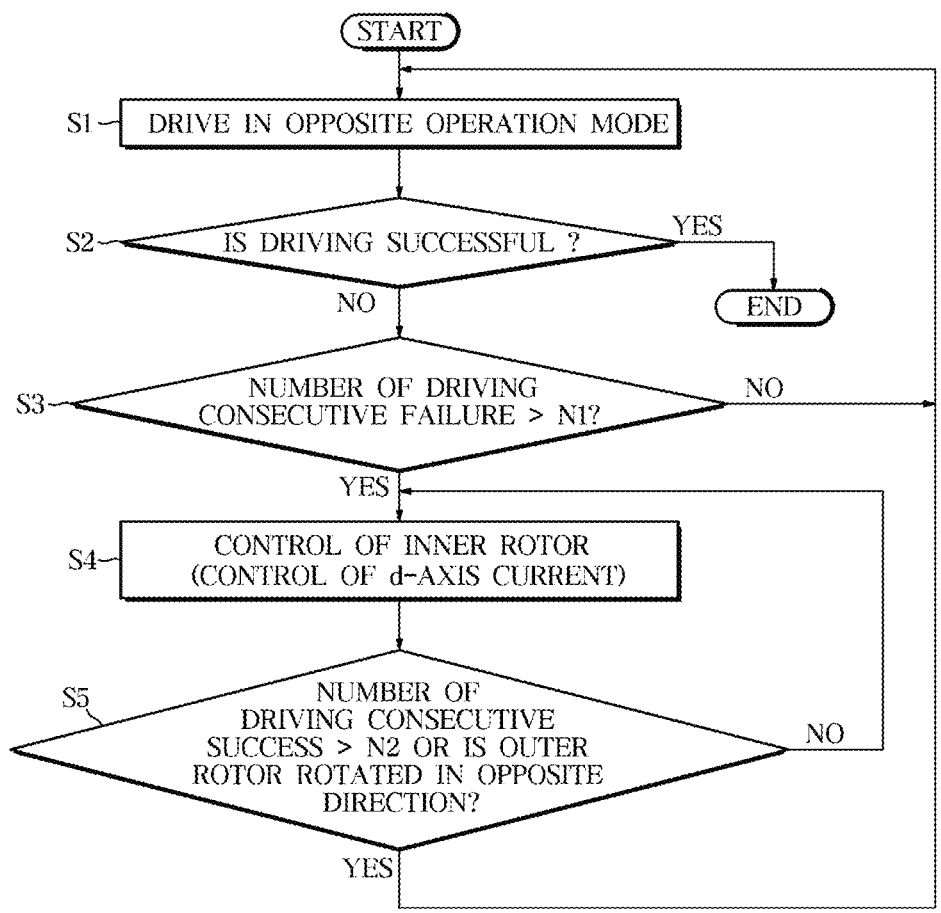
FIG. 6 is a flow chart illustrating a control operation of the motor according to an embodiment.

First, in step S1 of FIG. 6, the motor 50 starts driving in the opposite operation mode. Then, in step 2, when the driving is successful in the opposite operation mode (yes in step 2), it is out of the flow and the operation continues in the opposite operation mode (a general mode). On the other hand, when the driving fails in the opposite operation mode, the flow proceeds to step 3.

In step 3, whether a driving failure of the opposite operation mode exceeds a predetermined consecutive number of times N1 is identified. Until the number of consecutive failures exceeds N1 (no in step 3), the processing of steps 1 and 2 is repeated. On the other hand, when the number of consecutive failures exceeds N1 (yes in step 3), the flow proceeds to step 4.

In step 4, the dq-axis current command calculator 118 identifies that the motor 50 is in the lock state and performs the control to allow the motor 50 to be out of the lock state.

Figure 8:
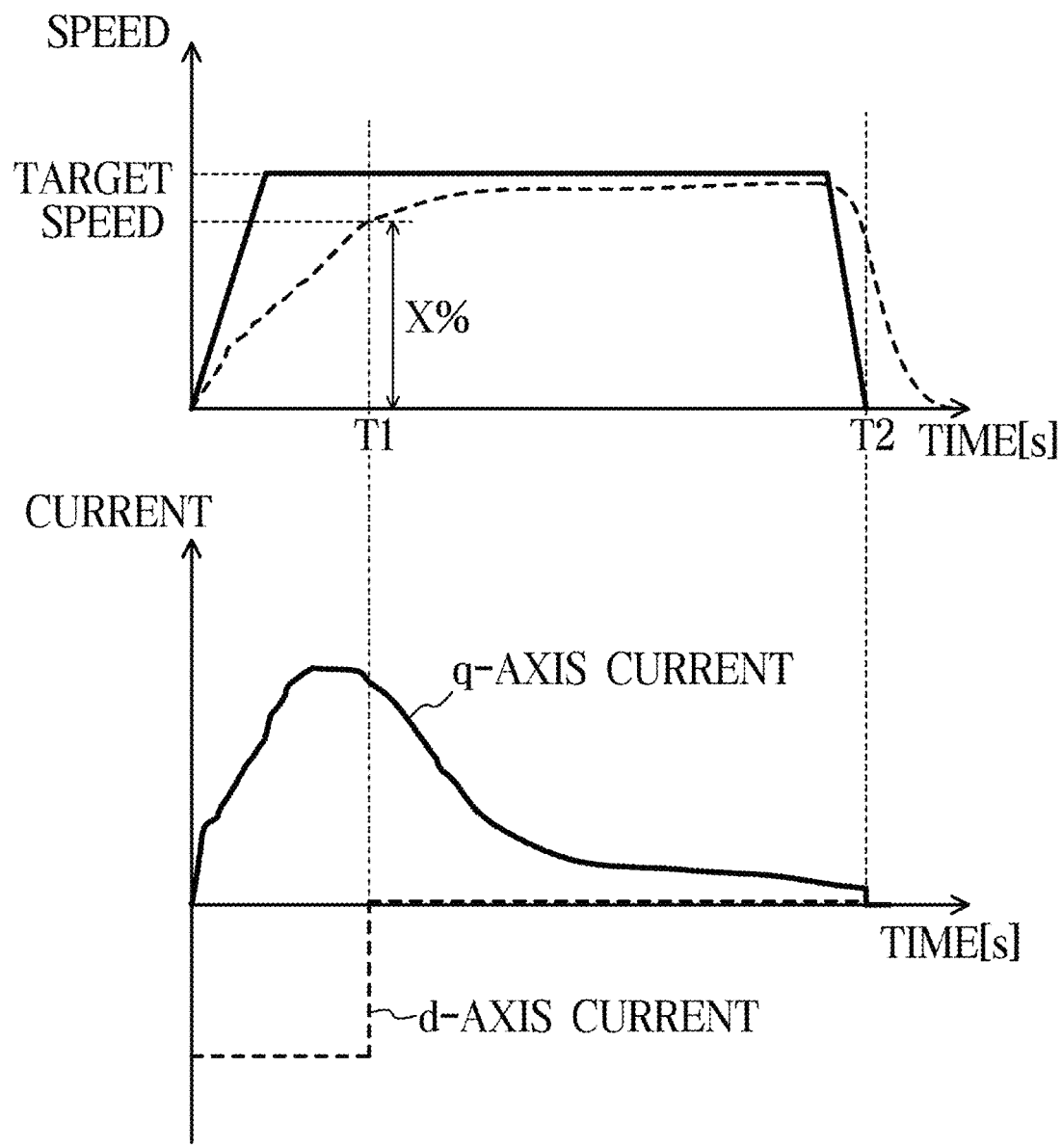
FIG. 8 is a view illustrating the d-axis current command and the q-axis current command.

Particularly, as illustrated in FIG. 8, (1) It is started on the control axis of the inner rotor 52 regardless of the outer rotor 53 that is set as the control axis. (2) A predetermined d-axis current command (id*) is given until the inner rotor reaches a predetermined revolutions (until reaching X % of a target speed in FIG. 8). (3) When the revolutions is increased without problems and then reaches the target speed, it is identified that the driving is successful. The q-axis current command (iq*) and the d-axis current command (id*) are set to zero (0) (refer to a time T2 of FIG. 8) and the flow proceeds to step 5. Accordingly, it is possible to change a state of the load (e.g., a state of laundry in the washing machine 1) and thus it is possible to be out of the lock state. When the target time is not reached for a predetermined period of time, it is identified as the driving failure, and the q-axis current command (iq*) and the d-axis current command (id*) are set to zero (0) (refer to a time T2 of FIG. 8) and the flow proceeds to step 5.

In step 5, whether a driving success exceeds a predetermined consecutive number of times N2, is identified. Until the number of consecutive driving successes exceeds N2 (no in step 5), the processing of step 4 is repeated. In step 4, the outer rotor and the inner rotor are driven at least one time in a forward and reverse rotation operation in which the outer rotor and the inner rotor rotate in different directions from each other. For example, in the process in step 4 of the second time, the outer rotor and the inner rotor rotate in the directions opposite to each other (hereinafter a reverse rotation) that is opposite to the direction (hereinafter a forward rotation) in which the outer rotor and the inner rotor initially rotate in opposite directions from each other. Accordingly, since the forward and reverse rotation operation in which the forward rotation and the reverse rotation is alternately performed, is performed at least one time, it is possible to more easily change the state of the load (e.g., the state of laundry in the washing machine 1).

As a result of repeated processing of step 4, when in step 5, the number of consecutive driving success exceeds N2

(yes in step 5), the flow returns to step 1. In step 4, during the forward and reverse rotation operation, the outer rotor 53 may rotate in the opposite direction about the inner rotor 52, and the motor 50 may return to the opposite operation. In this case, it is identified as "yes" in step 5 and the flow returns to step 1. Whether the outer rotor 53 rotates in the opposite direction about the inner rotor 52 may be identified by the outer speed detector 109.

As described above, according to an embodiment, when the motor is likely to be locked, it is possible to allow the motor to be out of the lock state.

Hereinbefore an appropriate embodiment has been described, but various modifications are allowed.

For example, in the above mentioned embodiment, the case in which the phase of the inner rotor 52 lags by the phase difference (θerr) with respect to the outer rotor 53 has been described, but is not limited thereto. For example, a case in which the phase of the outer rotor 53 lags by the phase difference (θerr) with respect to the inner rotor 52 is also the same as the above embodiment. Particularly, the relationship between the inner rotor 52 and the outer rotor 53 in the formula 1 may be reversed.

As is apparent from the above description, according to the proposed dual rotor type motor, it is possible to compensate a torque of the rotor in which phases are out of each other, and thus the high practical effect is obtained.

Although the present disclosure has been described with various embodiments, various changes and modifications may be suggested to one skilled in the art. It is intended that the present disclosure encompass such changes and modifications as fall within the scope of the appended claims.

What is claimed is:

1. A washing machine comprising:
   a housing including an inlet for laundry disposed on a front surface thereof;
   a water tub provided inside of the housing and configured to store water;
   a drum provided inside of the water tub and configured to rotate;
   a pulsator provided inside of the drum and configured to be rotated independently of the drum;
   a motor comprising a stator, a first rotor connected to the drum, and a second rotor connected to the pulsator;
   a phase detector configured to detect a phase difference between the first rotor and the second rotor; and
   at least one processor configured to:
   rotate the first rotor and the second rotor in directions opposite to each other,
   calculate the phase difference detected by the phase detector,
   apply a q-axis current to the stator to rotate the first rotor,
   apply a d-axis current to the stator to rotate at least one of the first rotor or the second rotor based on the phase difference between the first rotor and the second rotor, and
   apply a predetermined magnitude of d-axis current to the stator based on a forward and reverse rotation operation, wherein the forward and reverse rotation operation is performed by (i) performing a forward rotation operation rotating the first rotor and the second rotor in directions opposite to each other and (ii) performing a reverse rotation operation rotating the first rotor and the second rotor in a direction opposite to the forward rotation operation.

2. The washing machine of claim 1, wherein the at least one processor is configured to determine a magnitude of the d-axis current applied to the stator to rotate the at least one of the first or the second rotor based on the calculated phase difference being equal to or greater than a predetermined angle.

3. The washing machine of claim 2, wherein, when the calculated phase difference is equal to or greater than +90 degrees, the at least one processor is configured to determine the magnitude of the d-axis current based on a magnitude of q-axis current applied to the stator to rotate the first rotor.

4. The washing machine of claim 1, wherein, when the calculated phase difference is equal to or less than −90 degrees, the at least one processor is configured to reduce a magnitude of the d-axis current of the stator to rotate the at least one of the first rotor or the second rotor based on a magnitude of q-axis current applied to the stator to rotate the first rotor.

5. The washing machine of claim 1, wherein the at least one processor is configured to:
   apply the d-axis current to the stator to rotate the first rotor with respect to a dq-control axis corresponding to the first rotor, and
   switch the dq-control axis to the second rotor based on a predetermined number of driving failures.

6. The washing machine of claim 5, wherein the at least one processor is configured to apply the predetermined magnitude of d-axis current to the stator to rotate the second rotor based on a predetermined revolution.

7. The washing machine of claim 1, wherein the at least one processor applies the d-axis current again to the stator to rotate the first rotor based on (i) a number of successes of the forward and reverse rotation operation and (ii) the phase difference between the first rotor and the second rotor.

8. The washing machine of claim 1, wherein the first rotor is installed inside of the stator and the second rotor is installed outside of the stator.

9. A control method of a washing machine comprising a drum rotatably provided inside of a water tub, a pulsator configured to be rotated independently of the drum, a motor provided with a first rotor configured to rotate the drum and a second rotor configured to rotate the pulsator, and a single stator, a phase detector configured to detect a phase difference between the first rotor and the second rotor, and at least one processor configured to control the motor, the control method comprising:
   rotating the first rotor and the second rotor in directions opposite to each other,
   calculating the phase difference detected by the phase detector,
   applying a q-axis current to the stator to rotate the first rotor;
   applying a d-axis current to the stator to rotate at least one of the first rotor or the second rotor based on the phase difference between the first rotor and the second rotor; and
   applying a predetermined magnitude of d-axis current to the stator based on a forward and reverse rotation operation. wherein the forward and reverse rotation operation is performed by (i performing a forward rotation operation rotating the first rotor and the second rotor in directions opposite to each other and (ii) performing a reverse rotation operation rotating the first rotor and the second rotor in a direction opposite to the forward rotation operation.

10. The control method of claim 9, wherein the application of d-axis current comprises determining a magnitude of the d-axis current based on the calculated phase difference being equal to or greater than a predetermined angle.

11. The control method of claim 10, wherein the selection comprises, based on the calculated phase difference being equal to or greater than +90 degrees, determining the magnitude of the d-axis current applied to the stator to rotate the first rotor based on a magnitude of q-axis current applied to the stator to rotate the first rotor.

12. The control method of claim 9, wherein the selection comprises, based on the calculated phase difference being equal to or less than −90 degrees, reducing a magnitude of the d-axis current applied to the stator to rotate the at least one of the first rotor or the second rotor based on the magnitude of q-axis current applied to the stator to rotate the second rotor.

13. The control method of claim 9, further comprising, after applying the d-axis current to the stator to rotate the first rotor with respect to a dq-control axis corresponding to the first rotor, switching the dq-control axis to the second rotor based on a predetermined number of driving failures.

14. The control method of claim 13, further comprising applying the predetermined magnitude of d-axis current to the stator to rotate the second rotor based on a predetermined revolution.

15. The control method of claim 9, further comprising applying the d-axis current again to the stator to rotate the first rotor based on (i) a number of successes of forward and reverse rotation operation and (ii) the phase difference between the first rotor and the second rotor.

16. The control method of claim 9, further comprising applying the predetermined magnitude of d-axis current to the stator to rotate the second rotor based on a predetermined revolution.

* * * * *